LOGIC ARRAY FOR ASSOCIATIVE MEMORY

Filed March 25, 1965 3 Sheets-Sheet 1

INVENTOR
ROBERT C. MINNICK
BY Samuel Lindenberg
ATTORNEY $n = k(l+m)$ $s = p + qr$ $t = u'(v+w)$ $j = x' + yz$ $t = u + x'vw$

*INVENTOR.*
ROBERT C. MINNICK

INVENTOR
ROBERT C. MINNICK
BY Samuel Lindenberg
ATTORNEY 3,397,390
Patented Aug. 13, 1968

3,397,390

LOGIC ARRAY FOR ASSOCIATIVE MEMORY

Robert C. Minnick, Redwood City, Calif., assignor to Stanford Research Institute, Menlo Park, Calif., a corporation of California Filed Mar. 25, 1965, Ser. No. 442,711
8 Claims. (Cl. 340—172.5)

ABSTRACT OF THE DISCLOSURE

An array of logic cells is provided which affords comparision of two data words to determine whether there is inclusion or inverse inclusion present. Also, a column of identical dual cells is provided, which enables an arithmetical comparsion to be made and also, by appropriate cutting of connections between the two columns, a measure of inclusion or inverse inclusion can also be obtained.

This invention relates to computer logic and storage systems and more particularly to improvements therein.

In the storage of words in computer memories, it is often desirable to provide a storage address which is determined by the particular information or bits in the word to be stored. Memories that determine the address by the word are generally termed "associative." The particular addressing rules vary according to the most significant characteristics of the information in the particular computer application. For example, if arithmetic computations are to be performed, the size of the number represented by the word to be stored may be used to determine addressing.

In some applications, the addressing depends upon the relationship between the word to be stored, or a test word, and all of the words already stored in the memory. An arithmetic comparsion may be made, for example, to determine whether the number represented by the test word is larger than that of any other word already stored. Some of the other important comparisons include the direct inclusion match whereby it is determined which, if any, stored words are "included" in the test word, and the inverted inclusion match whereby it is determined whether the test word is "included" in any of the stored words, and the arithmetic comparsions whereby it is determined which stored words are "greater than" the test word and which are "equal to" the test word and which are "less than" the test word. Simple storage and comparsion cells for enabling such comparisons to be made in order to determine the proper address would be of great benefit in the construction of practical computer memories.

Accordingly, one object of the present invention is to provide associative memory systems characterized by simplicity of construction.

Another object is to provide simple and efficient data storage cells and arrays for enabling the comparsion of stored and test words to determine the existence of a predetermined relationship between them.

Still another object is to provide an efficient array of storage cells for indicating the existence of an inclusion match between stored and test words.

Yet another object is to provide an efficient array of storage cells for indicating whether the number represented by a stored word is greater or less than that of the test word.

The foregoing and other objects are realized by an array of logic cells, each providing an output which is a function of several inputs. One of the inputs to each cell is a bit from the stored word and another input is a corresponding bit from a test word, or a word whose address is to be determined. A third input to the cell is the output from the preceding cell in the array, with the input to the first cell normally being zero and the output of the last cell indicating whether the predetermined relationship between the stored and test words exist. The output of the last cell depends upon the outputs of each of the cells in the array, and therefore depends on the existence of the predetermined correspondence between each of the bits in the words to be compared.

Some comparisons can be made by an array of logic cells, wherein a column of identical logic cells connected in series and by supplying bits from the words to be compared to each cell. Such an arrangement can be used to determine the existence of an inclusion match of a test and stored word, or the existence of an inverse inclusion match. Normally, the data bit inputs to the inclusion match column are the complements of the data bit inputs required for the inversion match column of cells. Accordingly, both the bit and its complement must be delivered for each bit of the two words to be compared, where both the inclusion and inverted inclusion match are to be made. In accordance with this invention however, two columns of cells, or a column of identical dual cells, can be used to obtain both the inclusion and inverse inclusion matches, using only one input (either the bit or its complement) for each data bit of the words to be compared. The foregoing is made possible by choosing logic equations, upon which the design of the array is based, which make use of the relationship between inclusion and inverse inclusion. The array is constructed as two series connected chains wherein in each chain every other cell is of a first type and the other cells in between them are of a second type.

An array of logic cells for making certain comparisons, such as an arithmetic comparsion to determine whether one number is larger than another, generally requires complicated logic. A logic array to determine whether a stored word is greater than a test word may first compare corresponding bits to determine if any test bit is greater. The most significant bit position where any inequality occurs determines which word is larger. In accordance with this invention, a column of identical dual cells is provided which enables the comparison to be made with a relatively simple logic circuit.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

One of the useful comparisons which may be made between a stored and test word is termed an inclusion match. An inclusion match exists if, for every bit position, either the stored bit is one or the test bit is zero. For a word of $k$ bits, the corresponding logic expression is defined by the following:

$$a_k=(b_1+c_1')+(b_2+c_2')+\ .\ .\ .\ +(b_k+c_k') \quad (1)$$

where $b_1$ through $b_k$ represent the bits of the stored word, $c_1$ through $c_k$ represent the bits of the test word, $c'$ represents the complement of the corresponding input $c$, $+$ represents the "OR" function and two terms separated by a parentheses are related by the "AND" function, $a_k=1$ indicates the existence of an inclusion match, and $a_k=0$ indicates the absence of an inclusion match.

Figure 1:
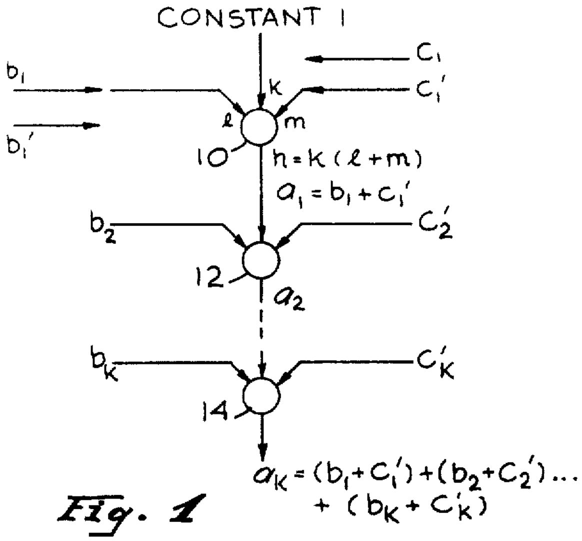
FIGURE 1 is a block diagram representation of an array of logic cells for determining the existence of an inclusion match between a stored and test word.

The inclusion match defined by Equation 1 may be implemented by a column of cells 10, 12, . . . 14, connected in series as shown in FIGURE 1. Each cell has three inputs $k$, $l$, and $m$ and one output $n$. The input $k$ is the output of a preceding cell, with the input of the first cell being equal to one. One input $l$ to each cell receives a bit $b$ of the stored word and another input $m$ receives the complement $c'$ of the corresponding bit of the test word. Both the bits $b_1$ and $c_1$ and their complements $b_1'$ and $c_1'$ are indicated to show that both the bits and their complements are normally available.

Figure 1A:
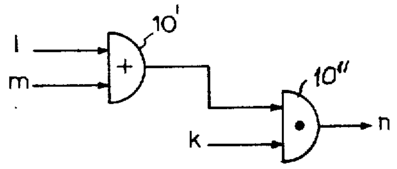
FIGURE 1A is a schematic diagram of a circuit arrangement for the logic cell shown in FIGURE 1.

The logic of each cell 10, 12, . . . 14, of FIGURE 1 is $n=k\ (l+m)$. A circuit arrangement as shown in FIGURE 1A wherein $l$ and $m$ are inputs to an OR gate 10', and the OR gate output and $k$ are inputs to an AND gate 10''. The AND gate output is $n$. Thus, the output of $a_1$ of the first cell 10 is $b_1+c_1'$ and the output $a_2$ of the second cell 12 is $(b_1+c_1')(b_2+c_2')$. The output $a_k$ of the last cell 14 is $(b_1+c_1')(b_2+c_2')+\ .\ .\ .\ +(b_k+c_k')$, which is the logic necessary to determine the existence of an inclusion match as given by Equation 1, where $a_k$ equals one indicates an inclusion match. It should be noted that, although the cells are shown arranged as a column, they may be arranged in any configuration as long as the connections are maintained the same, any such arrangement being termed an operational column to indicate that the array is electrically connected as though it were arranged as a column.

Another manner of dealing with the logic equation for an inclusion match is to deal with it in complementary form as follows:

$$a_k'=b_1'c_1+b_2'c_2+\ .\ .\ .\ +b_k'c_k \quad (2)$$

where the symbols $a$, $b$ and $c$ are as given for Equation 1, $b'$ is the complement of $b$, $a_k'$ is the complement of $a_k$, $a_k'=0$ indicates the existence of an inclusion match, and $a_k'=1$ indicates the absence of an inclusion match.

Figure 2:
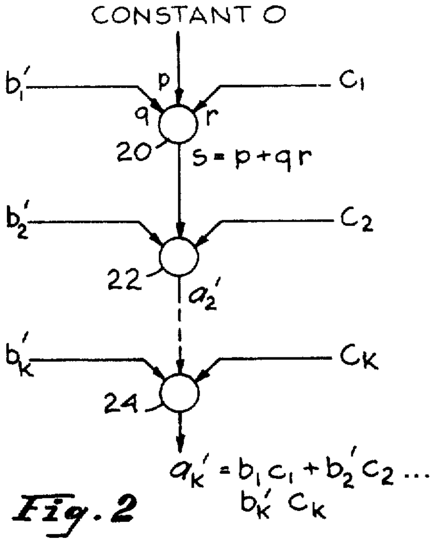
FIGURE 2 is a block diagram representation of another array of logic cells for determining the existence of an inclusion match between a stored and test word.
Figure 2A:
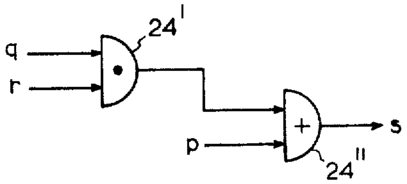
FIGURE 2A is a schematic circuit diagram of an arrangement for the logic cell shown in FIGURE 2.

The array of FIGURE 2 shows an implementation of Equation 2. The logic of each cell 20, 22, . . . 24, of FIGURE 2 is $s=p+qr$ with the final output being $a_k'=b_1'c_1+b_2'c_2+\ .\ .\ .\ +b_k'c_k$ for the inputs shown. A circuit for $s=p+qr$ is shown in FIGURE 2A wherein $q$ and $r$ are inputs to an AND gate 24'. The inputs to an OR gate 24'' are the output of AND gate 24' and $p$. The output of OR gate 24'' is $s$. An inclusion match exists when $a_k'$ equals zero.

Figures 3, 4:
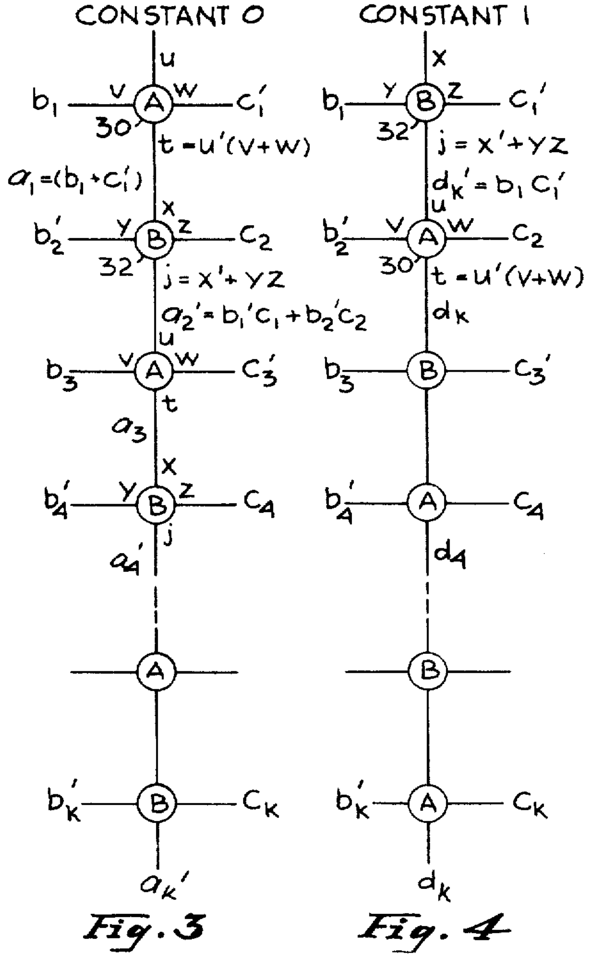
FIGURE 3 is a block diagram representation of an array of logic cells for determining the existence of an inclusion match between a stored and test word, utilizing two types of logic cells.
FIGURE 4 is a block diagram representation of an array of logic cells for determining the existence of an inverse inclusion match between a stored and test word, utilizing the same two types of logic cells which are used in the array of FIGURE 3.
Figure 3A:
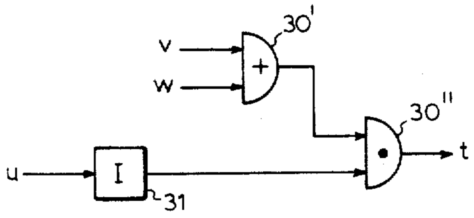
FIGURES 3A and 3B are schematic circuit diagrams of an arrangement for the logic cells shown in FIGURE 3.
Figure 3B:
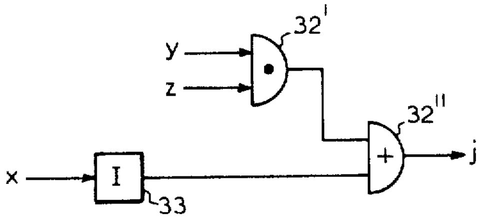

The existence of an inclusion match may be determined by a column composed of two kinds of logic cells with inputs as shown in FIGURE 3. The logic of one type of cell 30 labelled A is such that the output $t$ is related to the three inputs by the equation $t=u'(v+w)$. A circuit for this is shown in FIGURE 3A wherein an OR gate 30' has inputs $v$ and $w$. Its output together with an inverter 31 output, to which $u$ is applied, are applied to an AND gate 30''. The output of AND gate 30'' is $t$. The logic of the other type of cell 32 labelled B is such that the output $j=x'+yz$. This is shown schematically in FIGURE 3B, wherein an AND gate 32' has inputs $y$ and $z$ and OR gate 32'' has, as one input, the output of AND gate 32', and the other input is the output of an inverter 33, to which the input $x$ is applied. By alternating these cells as shown in FIGURE 3, the output from any cell is the same as is obtained from the corresponding cell in the arrays of FIGURES 1 or 2. Thus, the output $a_1$ of cell 30 is given as $a_1=b_1+c_1'$ which is the same output given by cell 10 of FIGURE 1; the output $a_2'$ of cell 32 is given as $a_2'=b_1'c_1+b_2'c_2$ which is the same output as is given by cell 22 of FIGURE 2. Where $k$ is an even number, an inclusion match is indicated by the output $a_k'=0$.

In many instances, it is necessary to determine whether an inverted inclusion match exists in providing an address for a test word. An inverted inclusion match exists if, for every bit position, the test word bit is one or the stored word bit is zero. The logic expression may be given by either of the following two equations:

$$d_k=(b_1'+c_1)(b_2'+c_2)+\ .\ .\ .\ +(b_k'+c_k) \quad (3)$$

$$d_k'=b_1c_1'+b_2c_2'+\ .\ .\ .\ +b_kc_k' \quad (4)$$

where $d_k=1$ or $d_k'=0$ indicates the existence of an inverted inclusion match.

Many types of arrays of logic cells can be used to determine the existence of an inverted inclusion match. Any of the arrays of FIGURES 1, 2 or 3 can be used by substituting $b'$ for $b$ and $b$ for $b'$ for all $b$ inputs and performing the same substitution for all $c$ or $c'$ inputs. One additional mechanization illustrated in FIGURE 4 uses the same two kinds of logic cells as employed in the array of FIGURE 3, but in a reverse order. Where $k$ is an even number an inverted inclusion for the array of FIGURE 4 is given by the output $d_k=1$.

Figure 5:
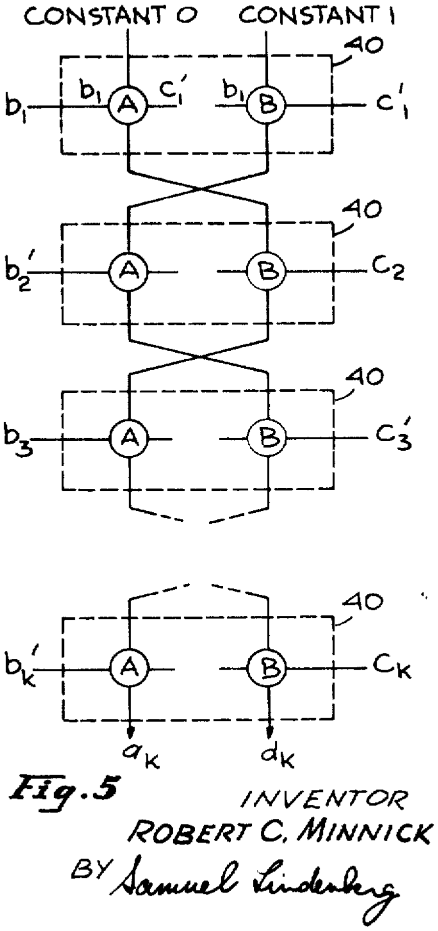
FIGURE 5 is a block diagram representation of an array of logic cells for determining both the existence of an inclusion match and of an inverse inclusion match of a stored and test word, wherein, for each bit of the words to be compared only the bit or its complement, but not both, are delivered to the array.

In applications where both the inclusion and the inverted inclusion match must be determined, a simplified array can be obtained by combining the arrays of FIGURES 3 and 4 to obtain the array of FIGURE 5. The simplification resides in the fact that only half as many input lines are required from the circuits which store the bits of the test and stored words, as would be required for two independent arrays where, for example, both a $b_1$ and $b_1'$ might be required. Although the circuit of FIGURE 5 is essentially the same as the two circuits of FIGURES 3 and 4 taken together, each of the composite cells 40 of FIGURE 5 is identical, with the connections being shown oriented diagonally.

One important comparison which must often be made in associative addressing is the arithmetic comparison whereby it is determined whether the stored word is greater than, less than, or equal to, the test word. The arithmetic comparison can be made by a series of logic cells which compares each corresponding bit of the stored and test words. The logic required for each cell must cause it to indicate that the stored word is "less than" the test word if any previous stored bit (of more significant place) was less than the corresponding test bit. Similarly, the test must indicate that the stored word is "more than" the test word if a previous stored bit was more than a corresponding test bit. If all previous bits were equal, however, then the cell output depends on the comparison of the stored and test bit inputs to that cell.

Figure 6A:
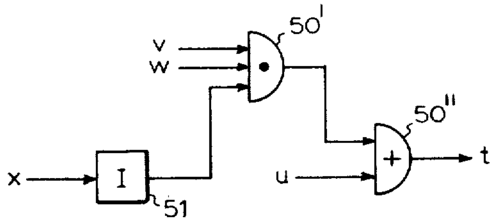
FIGURE 6A is a schematic circuit diagram of a logic cell which is used in FIGURE 6.
Figure 6:
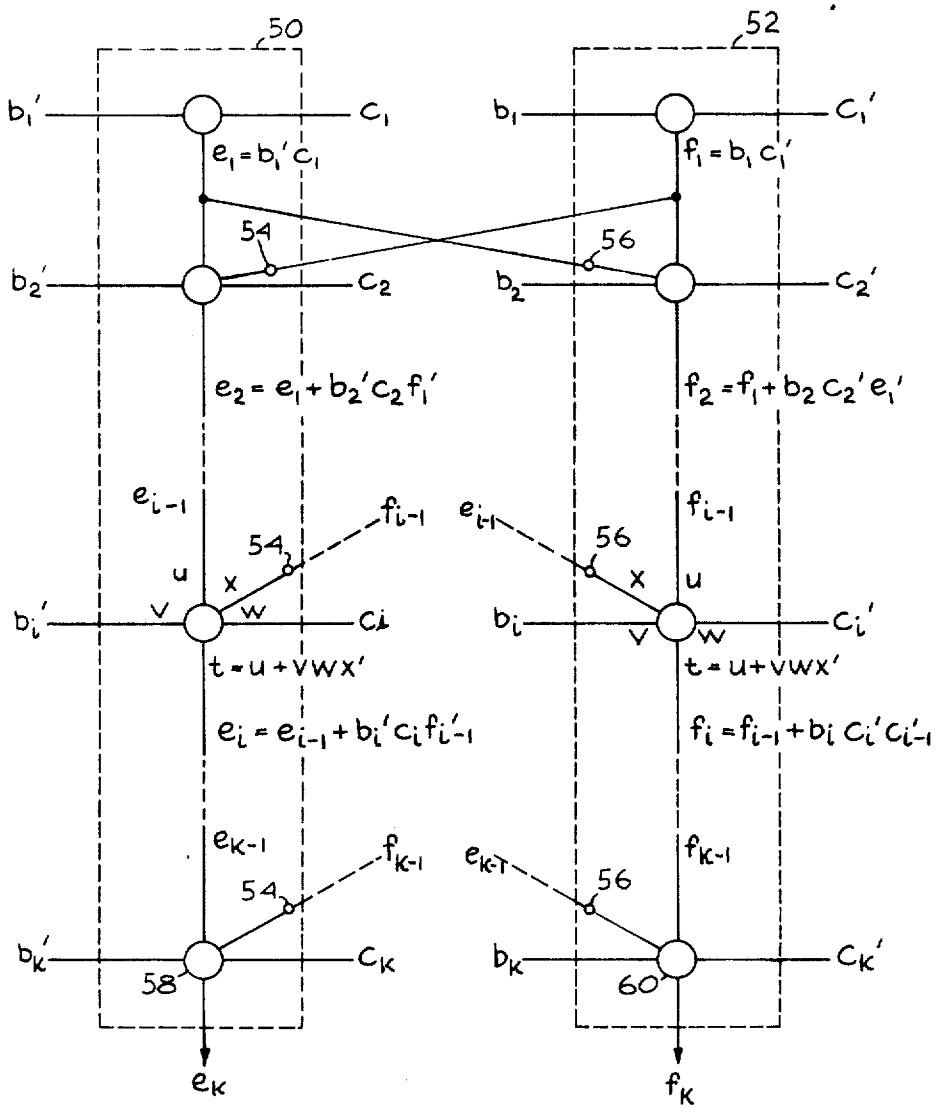
FIGURE 6 is a block diagram representation of an array of logic cells for making an arithmetical comparison of a stored and test word, and including cut points for converting the array into an array which determines the existence of an inclusion match and of an inverse inclusion match.

A cellular array for making an arithmetical comparison can be constructed by providing two operational columns of logic cells as illustrated in FIGURE 6, one column 50 for indicating the "more than" condition (i.e. that a previous stored bit was more than its corresponding test bit) and the other column 52 for indicating the "less than" condition. Each cell of the first column 50, which serves to indicate the "more than" condition has four input ports $u$, $v$, $x$ and $w$ and one output port $t$, the cell logic being given by the equation $t=u+vwx'$. A schematic of the circuit required is shown in FIGURE 6A wherein an AND gate 50 has inputs $v$ and $w$, and the output of an inverter 51 having as its input $x$. The output of the AND gate and a "$u$" input are applied to OR gate 50″ whose output is $t$. For the inputs provided, each cell of the first column 50 produces the following function:

$$e_i=e_{i-1}+b_i'c_i\cdot f_{i-1}' \quad (5)$$

where $e_i$ is the binary output of the $i$th cell, $e_{i-1}$ is the binary output of the preceding cell, $b_i'$ is the complement of the $i$th bit of the stored word, $c_i$ is the $i$th bit of the test word, $f_{i-1}$ is the binary output of the preceding cell in the "less than" column, $f_{i-1}=1$ indicating that a previous stored bit was less than a corresponding test bit, and $e_i=1$ indicates the "more than" condition.

It should be appreciated that once a "more than" condition occurs, $e=1$ for all following cells. Similarly, once a "less than" condition has occurred (by virtue of $f_{i-1}=1$), then $e$ can never be one, and therefore can never indicate "more than."

Each cell of the second column 52, which serves to indicate the "less than" condition has the same cell logic as the cells of column 50, i.e. the output is given by $t=u+vwx'$. For the inputs provided to each cell of the second column 52, the cell produces the following function:

$$f_i=f_{i-1}+b_ic_i'e_{i-1}' \quad (6)$$

where the symbols are as given in connection with Equation 5 and where $f_i=1$ indicates the "less than" condition.

In the array of FIGURE 6, the bit positions $b_1$ and $c_1$ are the most significant, so that they determine whether the "more" or "less" conditions are indicated (if $b_1$ and $c_1$ are not equal) regardless of the values of the other bits $b_2$ through $b_k$, and $c_2$ through $c_k$.

A number of cutpoints 54 and 56 are provided in the array of FIGURE 6 which are points at which the connections between the two columns of cells 50 and 52 may be opened. When the connections are opened while the inputs $b'$ and $c$ to the cells remain the same, the output of the last cell 58 in column 50 is given by:

$$e_k=b_1'c_1+b_2'c_2+ \ . \ . \ . \ +b_k'c_k \quad (7)$$

which is the same as the logic equation for obtaining the complement of the inclusion match as set forth by Equation 2 and implemented by the array of FIGURE 2. Thus, with the connections between column 52 and 50 opened at cutpoints 56, the output $e_k$ indicates whether an inclusion match exists between the stored word with bits $b_1$ through $b_k$ and the test word with bits $c_1$ through $c_k$. When $e_k=0$ an inclusion match exists and when $e_k=1$ there is no inclusion match.

When the connections between columns 50 and 52 are opened at cutpoints 54, the column 52 serves to indicate whether an inverted inclusion match exists between the stored and test words. For the inputs $b$ and $c'$ to each cell provided in the array of FIGURE 6, the output of the last cell 60 is given by:

$$f_k=b_1c_1'+b_2c_2'+ \ . \ . \ . \ +b_kc_k' \quad (8)$$

which is the same as the equation for obtaining the complement of the inverted inclusion match set forth by Equation 4. When $f_k=0$, an inverted inclusion match exists and when $f_k=1$ there is no inclusion match.

Thus, the array of FIGURE 6, with the cutpoints 54 and 56, can be employed to provide an arithmetic comparison, an inclusion match, or an inverted inclusion match without altering the connections of the word bit inputs to any of the cells of the array. The cutpoints can be any of a variety of switching means such as photoconductive resistors, wires which can be cut, or contact switches.

The actual construction of the basic logic cells and arrays of this invention can be realized by any of a large variety of electronic or pneumatic logic circuits, the construction of which is well known in the art. For this reason, the details of circuitry of the various cells whose logic is described herein, have not been described.

Although particular embodiments of the invention have been described in detail, many further modifications may be employed without departing from the spirit and scope of the claims which follow herein.

What is claimed is:

1. A plurality of cells arranged in series to form two adjacent columns for use in a data comparison circuit, each cell having a binary output $t$ and four binary inputs $u$, $v$, $w$ and $x$ and having its output related to its inputs by the logic equation $t=u+vwx'$; and conductors for connecting the output $t$ of each cell to the input $u$ of a succeeding cell in the same column and to the input $x$ of the succeeding cell in the adjacent column.

2. A plurality of cells as claimed in claim 1, including cut point means for disconnecting said input $x$ of each cell from said output $t$ of the preceding cell in an adjacent column, whereby to enable said plurality of cells to perform a different comparison.

3. An array for comparing two data words to determine the existence of a direct inclusion match comprising a plurality of a first type of logic cell, each cell having three inputs $u$, $v$, $w$ and an output $t$, and generating the binary function $t=u'(v+w)$; a plurality of a second type of logic cell, each cell having three inputs $x$, $y$, and $z$ and an output $j$, and generating the binary function $j=x'+yz$; said first and second cells connected in a series arrangement wherein the output $t$ of a first type logic cell is connected to the $x$ input of a second type logic cell, and wherein the $j$ output of the second type logic cell is connected to the $u$ input of a first type logic cell; means for conducting signals representing alternate bits of a first data word to said $v$ inputs of said first logic cells; means for conducting signals representing the complement of bits of said first data word other than said alternate bits of said first data word, to said $y$ inputs of said second logic cells; means for conducting signals representing alternate bits of a second word to said $z$ inputs of said second logic cells; and means for conducting signals representing the complement of bits of said second data word, other than said alternate bits of said second data word, to said $w$ inputs of said second logic cells whereby the output of the last cell in said series arrangement has one binary value when there is a direct inclusion match of said first data word and said second data word, otherwise it has a second binary value.

4. An array for comparing two data words to determine the existence of an inclusion match and of an inverted inclusion match comprising a plurality of logic cells, each of said cells including a first portion providing an output $t$ related to inputs at three input ports thereof $u$, $v$ and $w$ by the binary logic function $t=u'(v+w)$, each of said cells including a second portion providing an output $j$ related to inputs at three input ports thereof $x$, $y$ and $z$ by the binary logic function $j=x'+yz$; said plurality of logic cells arranged in an operational column wherein the $t$ and $j$ outputs of each cell are connected to the $x$ and $u$ input ports, respectively, of the next cell in the column, means for conducting signals representing alternate bits of a first data word to said $y$ inputs of said first portion of said logic cells, means for conducting signals representing the complement of bits of said first data word other than said alternate bits of said first data word to said $z$ inputs of said second portion of said logic cells, means for conducting signals representing alternate bits of a second word to said $w$ inputs of said first portion of said logic cells, and means for conducting signals representing the complement of bits of said second data word other than said alternate bits of said second data word to said $z$ inputs of said second portion of said logic cells, whereby the output of the last cell in said series arrangement has a one binary value when there is an inverted inclusion match of said two data words, otherwise it has a second binary value.

5. An array for comparing one of two data words with the other to determine the existence of an inclusion match and of an inverted inclusion match comprising a plurality of logic cells, each of said cells including a first portion providing an output $t$ related to inputs at three input ports thereof $u$, $v$ and $w$ by the binary logic function $$t=u'(v+w)$$

each of said cells including a second portion providing an output $j$ related to inputs at three input ports thereof $x$, $y$, and $z$ by the binary logic function $j=x'+yz$; said plurality of logic cells arranged in an operational column wherein the $t$ and $j$ outputs of each cell are connected to the $x$ and $u$ input ports, respectively, of the next cell in the column; the $u$ input port of the first cell of the entire column having a constant input of a first binary value and the $x$ input portion of said first cell of the entire column having a constant input of a second binary value, means for complementing the alternate binary bits of said one of said two data words, leaving the remaining bits uncomplemented, means for complementing the alternate binary bits of said other data word leaving the remaining bits uncomplemented, means for applying said uncomplemented and complemented data bits of said one word to said respective input ports of said first cell portions and to the respective $y$ input ports of said second cell portions, and means for applying said complemented and uncomplemented data to the respective two input ports of said second cell portions and to the respective $w$ input ports of said first cell portions, whereby the output of said first column is a binary one when an inclusion match is present and the output of said second column is one when an inverted inclusion match is present.

6. An array for comparing first and second data words which are defined by sources which deliver the binary value of each bit of each of the words, whereby to determine the existence of an inclusion match and of an inverse inclusion match comprising a plurality of logic cells arranged in an operational column, each of said cells including a first and a second portion, each portion having three input ports and an output port, a first of said input ports connected to a source which delivers a signal indicating the binary value of a particular bit of said first word and a second of said input ports connected to a source which delivers a signal indicating the binary value of a corresponding bit of said second word; a plurality of conductors connecting the output port of the first cell portion of a cell to a third input port of a second cell portion of the next logic cell in a column; a plurality of conductors connecting the output of the second cell portion of a cell to a third input port of the first cell portion of the next logic cell in the column; said first cell portions of each cell providing an output comprising the "AND" function of a first term and a second term, said first term being the complement of the signal to said third input port thereto and said second term being the "OR" function of one bit and the complement of the corresponding other bit of said first and second words, said second cell portions of each cell providing an output comprising an OR function of the complement of the second input with the AND function of the first and third inputs, means for complementing the alternate binary bits of said one of said two data words leaving the remaining bits uncomplemented, means for complementing the alternate binary bits of said other data word leaving the remaining bits uncomplemented, means for applying said uncomplemented and complemented data bits of said one word to said respective $v$ input ports of said first cell portions to the respective $y$ input ports of said second cell portions, and means for applying said complemented and uncomplemented data bits to the respective $z$ input ports of said second cell portions and to the respective $w$ input ports of said first cell portions, whereby the output of said first column is a binary one where an inclusion match is present and the output of said second column is a binary one where an inverted inclusion matches.

7. An array for comparing a first word and a second word comprising first and second operational columns of logic cells, each column having sets of corresponding cells, each of said cells having four inputs and an output, a first of said inputs of each cell receiving a first binary signal indicating the binary value of a particular bit of said first word, a second of said inputs of each cell receiving a second binary signal indicating the complement of the binary value of a corresponding bit of said second word, a third of said inputs of each cell connected to the output of the preceding cell in the same column of cells, and a fourth of said inputs of each cell connected to the output of the preceding cell in the other operational column; the output of each cell in said first column including the "OR" function of a first term which is equal to said third input thereto, and of a second term, said second term equal to the "AND" function of the complement of said fourth input, said first binary signal of said first word, and the corresponding second binary signal of said second word; the output of each cell in said second column including the "OR" function of a first term which is equal to said third input thereto, and a second term, said second term equal to the "AND" function of the complement of said fourth input, said first binary signal of said first word, and the second binary signal of the corresponding bit of said second word, whereby the output of the last cell of the first column produces a binary one when said first word is larger than said second word, and the output of the last cell in the second column produces a binary one when the second word is larger than the first word.

8. An array as defined in claim 7 including cutpoint means disposed in series with said fourth input of each of said cells, whereby to enable the performance of an inclusion and inverse inclusion match.

References Cited

UNITED STATES PATENTS

| | | | |
|---|---|---|---|
| 3,221,158 | 11/1965 | Roth et al. | 340—172.5 |
| 3,290,659 | 12/1966 | Fuller et al. | 340—172.5 |

OTHER REFERENCES

Hurley: Transistor Logic Circuits, 1961, J. Wiley & Sons, Inc. Publisher, pp. 22–24 and 59–69.

PAUL J. HENON, *Primary Examiner.*
P. R. WOODS, *Assistant Examiner.*